(12) United States Patent
Brück

(10) Patent No.: US 7,765,798 B2
(45) Date of Patent: Aug. 3, 2010

(54) METHOD AND DEVICE FOR REDUCING THE NITROGEN OXIDE PROPORTION IN THE EXHAUST GAS OF AN INTERNAL COMBUSTION ENGINE

(75) Inventor: Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 84 days.

(21) Appl. No.: 12/098,494

(22) Filed: Apr. 7, 2008

(65) Prior Publication Data

US 2008/0216467 A1 Sep. 11, 2008

Related U.S. Application Data

(63) Continuation of application No. PCT/EP2006/009467, filed on Sep. 29, 2006.

(30) Foreign Application Priority Data

Oct. 6, 2005 (DE) .................. 10 2005 048 117

(51) Int. Cl.
*F01N 3/00* (2006.01)
(52) U.S. Cl. .................. 60/286; 60/274; 60/295; 60/297; 60/301
(58) Field of Classification Search ............ 60/274, 60/286, 295, 297, 301, 303
See application file for complete search history.

(56) References Cited

U.S. PATENT DOCUMENTS

| | | | |
|---|---|---|---|
| 5,628,186 A | 5/1997 | Schmelz | |
| 5,785,937 A | 7/1998 | Neufert et al. | |
| 5,833,932 A | 11/1998 | Schmelz | |
| 6,253,543 B1 * | 7/2001 | Russell | ............ 60/274 |
| 6,470,676 B2 | 10/2002 | Dölling et al. | |
| 6,755,014 B2 * | 6/2004 | Kawai et al. | ............ 60/286 |

(Continued)

FOREIGN PATENT DOCUMENTS

DE 43 15 278 A1 11/1994

(Continued)

OTHER PUBLICATIONS

International Search Report, dated Jul. 12, 2006.

*Primary Examiner*—Tu M Nguyen
(74) *Attorney, Agent, or Firm*—Laurence A. Greenberg; Werner H. Stemer; Ralph E. Locher

(57) ABSTRACT

A method and device for reducing the nitrogen oxide proportion in exhaust gas of an internal combustion engine, carry out selective catalytic reduction on a reduction catalytic converter, at least discontinuously supplied with reducing agent. A reduction catalytic converter storage capacity for reducing agent and dependence of the storage capacity on temperature of the catalytic converter are considered when determining the reducing agent amount to be supplied. The reducing agent amount to be supplied can be adjusted to future temperature of the reduction catalytic converter and storage capacity at that temperature, for example preventing the reducing agent from desorbing from the catalytic converter when the temperature of the catalytic converter increases, e.g. by regenerating a particle filter. A reduced reducing agent amount is therefore supplied prior to regeneration of the particle filter instead of an amount required for stoichiometrically reacting nitrogen oxides in the exhaust gas without considering storage capacity.

11 Claims, 1 Drawing Sheet

U.S. PATENT DOCUMENTS

| | | |
|---|---|---|
| 6,833,272 B1 | 12/2004 | Moos et al. |
| 6,892,530 B2 * | 5/2005 | Montreuil et al. ............. 60/295 |
| 6,928,359 B2 | 8/2005 | Xu et al. |
| 6,941,746 B2 * | 9/2005 | Tarabulski et al. ............ 60/286 |
| 6,993,900 B2 * | 2/2006 | Upadhyay et al. ............. 60/286 |
| 7,028,465 B2 * | 4/2006 | Ripper et al. ................. 60/286 |
| 7,086,223 B2 * | 8/2006 | Itoh et al. ..................... 60/286 |
| 7,093,427 B2 * | 8/2006 | van Nieuwstadt et al. ..... 60/286 |
| 7,174,705 B2 | 2/2007 | Binder et al. |
| 2003/0036841 A1 | 2/2003 | Xu et al. |
| 2003/0037542 A1 | 2/2003 | Xu et al. |
| 2005/0274108 A1 | 12/2005 | Schulte et al. |

FOREIGN PATENT DOCUMENTS

| | | |
|---|---|---|
| DE | 4315278 A1 | 11/1994 |
| DE | 199 01 915 C1 | 4/2000 |
| DE | 19901915 C1 | 4/2000 |
| DE | 199 31 007 A1 | 1/2001 |
| DE | 19931007 A1 | 1/2001 |
| DE | 100 43 798 A1 | 3/2002 |
| DE | 10043798 A1 | 3/2002 |
| DE | 10131588 A1 | 1/2003 |
| DE | 102 33 665 A1 | 2/2003 |
| DE | 10226636 A1 | 2/2003 |
| DE | 10233665 A1 | 2/2003 |
| DE | 10228660 A1 | 1/2004 |
| DE | 10313998 A1 | 10/2004 |
| DE | 202005008146 U1 | 9/2005 |
| EP | 0 617 199 A1 | 9/1994 |
| EP | 0617199 A1 | 9/1994 |
| WO | 96/04980 A1 | 2/1996 |
| WO | 9604980 A1 | 2/1996 |

* cited by examiner

METHOD AND DEVICE FOR REDUCING THE NITROGEN OXIDE PROPORTION IN THE EXHAUST GAS OF AN INTERNAL COMBUSTION ENGINE

CROSS-REFERENCE TO RELATED APPLICATIONS

This is a continuation, under 35 U.S.C. §120, of copending International Application No. PCT/EP2006/009467, filed Sep. 29, 2006, which designated the United States; this application also claims the priority, under 35 U.S.C. §119, of German Patent Application DE 10 2005 048 117.5, filed Oct. 6, 2005; the prior applications are herewith incorporated by reference in their entirety.

BACKGROUND OF THE INVENTION

Field of Invention

The present invention relates to a method and a device for reducing the nitrogen oxide proportion or concentration in the exhaust gas of an internal combustion engine. The invention can preferably be used in the treatment of exhaust gases in automobiles.

Worldwide, many countries have set legal regulations which define an upper limit value for the content of certain substances in the exhaust gas of internal combustion engines. That relates for the most part to substances for which discharge to the atmosphere is undesirable. One of the substances is nitrogen oxides ($NO_x$), the proportion of which in the exhaust gas must not exceed legally defined limit values. Due to boundary conditions, for example the design of internal combustion engines for favorable consumption and the like, the engine-internal prevention of nitrogen oxide emissions is only suitable to a limited extent for the reduction of the proportion of nitrogen oxides in the exhaust gas, so that exhaust-gas aftertreatment is necessary in order to adhere to relatively low limit values. In that case, it has been proven that a selective catalytic reduction (SCR) of the nitrogen oxides is advantageous. The SCR method requires a reducing agent which contains nitrogen. The use of ammonia ($NH_3$) as a reducing agent has, in particular, proven to be one possible alternative. A reduction of the nitrogen oxides to form molecular nitrogen takes place with simultaneous consumption of the reducing agent. The selective catalytic reduction conventionally takes place in the exhaust gas as it flows through a correspondingly constructed catalyst carrier body. The latter is conventionally provided in such a case with a catalytically active material, for example in the form of a corresponding coating containing catalytically active substances. Coatings of that type have a storage capacity for the reducing agent, in particular ammonia. The storage capacity is conventionally not taken into consideration in the regulation of the supply of reducing agent, so that a discharge of non-converted nitrogen oxides or of reducing agent to the atmosphere can occur.

BRIEF SUMMARY OF THE INVENTION

It is accordingly an object of the invention to provide a method and a device for reducing the nitrogen oxide proportion in the exhaust gas of an internal combustion engine, which overcome the hereinafore-mentioned disadvantages of the heretofore-known methods and devices of this general type and which reduce or eliminate the probability of reducing agent being discharged to the atmosphere.

With the foregoing and other objects in view there is provided, in accordance with the invention, a method for reducing the nitrogen oxide proportion in the exhaust gas of an internal combustion engine. The method comprises carrying out a selective catalytic reduction at a reduction catalytic converter by providing a reducing agent at least in a discontinuous manner. A quantity of the reducing agent to be provided or supplied is determined by taking into consideration a storage capacity of the reduction catalytic converter for the reducing agent and a dependency of the storage capacity on a temperature of the reduction catalytic converter.

A reduction catalytic converter is to be understood to mean a structure which has catalytic substances that catalyze the selective catalytic reduction of the nitrogen oxides. The coating includes, for example, titanium dioxide (anatase)-supported vanadium/tungsten mixed oxide or metal-exchanged zeolites, preferably iron zeolites. The structure can include a honeycomb body composed, for example, of ceramic, into which the catalytic substances are, in particular, embedded, or else a honeycomb body which is constructed from at least one metallic layer, for example a sheet metal foil and/or a metallic layer produced from a porous metallic material. The honeycomb bodies include cavities through which an exhaust gas can flow. The honeycomb body can have a corresponding coating, for example a ceramic washcoat, with the catalytic substances. Ammonia ($NH_3$) is preferably used as a reducing agent. The storage capacity is to be understood to mean the quantity of reducing agent which can be stored in the coating and/or in the honeycomb body and, in particular, adsorbed, preferably physisorbed and/or chemisorbed, therein or thereon. An at least discontinuous supply is to be understood to mean a supply which can take place discontinuously or continuously. The supply includes, in particular, the addition of a reducing agent precursor which reacts to form reducing agent, the addition of reducing agent and the generation of a reducing agent precursor and/or reducing agent from substances present in the exhaust gas.

The storage capacity of the reduction catalytic converter for reducing agent conventionally falls with increasing temperature, so that with increasing temperature of the reduction catalytic converter and without the method according to the invention, desorption of reducing agent out of the reduction catalytic converter can occur. However, since the temperature of the reduction catalytic converter can be determined, preferably measured and/or calculated, it is possible to calculate a future temperature of the reduction catalytic converter, so that the quantity of reducing agent to be provided can be adapted. An adaptation is to be understood, in particular, to mean a reduction in the quantity of reducing agent to be provided. The provision or supply of a reduced quantity of reducing agent in relation to that which is necessary for the complete conversion of the nitrogen oxides does not fundamentally lead to an emission of nitrogen oxides into the atmosphere if reducing agent is stored in the reduction catalytic converter. Due to the high affinity of the nitrogen oxides to the reducing agent, in particular to ammonia, the latter is released out of the reduction catalytic converter and can react with the nitrogen oxide.

For example, the regeneration of a particle separator, in particular of a closed particle filter, of a secondary flow filter and/or of an electrostatic particle separator, leads to an increased temperature of the exhaust gas due to the oxidation of the carbon of the particles. If the reduction catalytic converter is situated downstream of the particle separator, the temperature of the reduction catalytic converter therefore also increases. Due to the increased temperature, the storage capacity of the reduction catalytic converter falls, so that when the stored quantity of reducing agent lies above the reduced storage capacity, the difference between the quantity and the storage capacity at the present temperature is discharged, in particular desorbed. That results in an undesired release of reducing agent to the atmosphere. According to the invention, however, the temperature dependency of the storage capacity is taken into consideration. This means, for example, that when the particle separator is in need of regeneration, that is to say, for example, the loading of the particle separator lies above a limit value, a regeneration is not carried out directly, but rather the temperature profile which is to be expected in the reduction catalytic converter due to the regeneration is firstly calculated. In this case, the quantity of carbon which is to be oxidized is, in particular, also taken into consideration. The quantity of reducing agent which is released from the reduction catalytic converter is calculated on the basis of the temperature profile. The quantity is then taken into consideration in the provision or supply of reducing agent. In particular, the quantity of reducing agent to be provided in the exhaust system is reduced over a time period until the regeneration is carried out. The regeneration is, in particular, first carried out when the quantity of reducing agent stored in the reduction catalytic converter is less than or equal to the storage capacity of the reduction catalytic converter at the maximum temperature present at the reduction catalytic converter during the regeneration.

As the temperature falls, that is to say with increasing storage capacity for reducing agent, the quantity of reducing agent to be provided can be increased in such a way that, despite the storage of reducing agent in the reduction catalytic converter, as complete a conversion as possible of the nitrogen oxides in the exhaust gas takes place. If the quantity of the reducing agent stored in the reduction catalytic converter reaches the storage capacity at the corresponding temperature, then the quantity of reducing agent to be provided can again be reduced to the quantity which is required for the conversion of the nitrogen oxides present in the exhaust gas.

Alternatively or in addition to the fact that a storage capacity of the reduction catalytic converter and the dependency of the storage capacity on the temperature of the reduction catalytic converter are taken into consideration in the provision of the reducing agent, it is also possible for an oxidation catalytic converter to be provided downstream of the reduction catalytic converter. The oxidation catalytic converter oxidizes the reducing agent which passes through the reduction catalytic converter. The oxidation catalytic converter is preferably dimensioned in such a way that the quantity of reducing agent from the reduction catalytic converter during a temperature jump from the normal operating temperature to the increased temperature in the reduction catalytic converter which acts during the regeneration of a particle separator can be reliably converted, so that even then the discharge of reducing agent to the atmosphere can be prevented.

In accordance with another mode of the method of the invention, a future profile of the temperature of the reduction catalytic converter is calculated.

The calculation of the future profile of the temperature of the reduction catalytic converter can take into consideration measured values of the temperature of the reduction catalytic converter and/or at other points of the exhaust system of the internal combustion engine. It is alternatively or additionally possible to resort to control data, for example to a characteristic map of the internal combustion engine or the like. The calculation can also take into consideration future events such as, for example, the regeneration of a particle separator. The calculation can include a pure extrapolation of the present situation or else models generated on the basis of earlier data, which models, for example, take into consideration usual driving behaviors of the driver.

In accordance with a further mode of the method of the invention, in the event of an expected increase in the temperature of the reduction catalytic converter, the resulting quantity of reducing agent which would be released from the reduction catalytic converter is calculated, and the resulting quantity is taken into consideration in the provision of the reducing agent. The resulting quantity can, for example, be calculated as a difference between the storage capacity at the lower temperature and the storage capacity at the higher temperature. It is, for example, possible, in a manner adapted to the quantity of nitrogen oxides in the exhaust gas, which can be measured and/or calculated, for example, from the engine characteristic map of the internal combustion engine, for the provision of the reducing agent to be suspended or reduced until the required quantity of reducing agent has been released from the reduction catalytic converter.

In accordance with an added mode of the method of the invention, a time profile of the release of reducing agent is calculated.

It is easily possible to calculate the time profile of the storage capacity and therefore also the time profile of the release of reducing agent, from the temperature profile at the reduction catalytic converter. The profile can be taken into consideration in the provision of the reducing agent by virtue, for example, of the quantity of reducing agent to be provided being correspondingly reduced for the times at which a release is to be expected.

In accordance with an additional mode of the method of the invention, the time profile of the release is taken into consideration in the determination of the quantity of reducing agent to be provided.

In particular, when a slow temperature rise is present or expected, the reducing agent released from the reduction catalytic converter can also be used, for the conversion of the nitrogen oxides, at the time of the release, so that a smaller reduction in the quantity of reducing agent to be provided can take place in advance.

In accordance with yet another mode of the method of the invention, in the event of an expected decrease in the temperature of the reduction catalytic converter, the quantity of reducing agent which is to be stored in the reduction catalytic converter is calculated and is taken into consideration in the provision of the reducing agent.

In such a case, it is thus possible for the provided quantity of reducing agent to be increased for a short time, so that despite a storage of the reducing agent in the reduction catalytic converter, a substantially complete conversion of the nitrogen oxides present in the exhaust gas takes place.

In accordance with yet a further mode of the method of the invention, a time profile of the storage of reducing agent is calculated.

In accordance with yet an added mode of the method of the invention, the time profile of the storage is taken into consideration in the determination of the quantity of reducing agent to be provided.

It is thus possible for the quantity of reducing agent to be provided to be defined in such a way that the reducing agent reacts with nitrogen oxides and is stored in the reduction catalytic converter at all times, but does not pass through the reduction catalytic converter without reacting.

In accordance with yet an additional mode of the method of the invention, the temperature of the reduction catalytic converter is determined in at least one of the following ways:

measuring the temperature of the reduction catalytic converter, and calculating the temperature of the reduction catalytic converter.

The temperature can be measured by using conventional measuring sensors. The temperature of the reduction catalytic converter can be calculated on the basis of various data. In accordance with again another mode of the method of the invention, in this context, it is particularly preferable for at least one of the following items of information to be taken into consideration in the calculation of the temperature of the reduction catalytic converter:

a measured temperature upstream of the reduction catalytic converter;
a measured temperature downstream of the reduction catalytic converter;
present operating data of the internal combustion engine;
operating data of the internal combustion engine from the past;
a regeneration behavior of a particle separator; and
a loading of a particle separator.

In particular, when the flow conditions in the exhaust system are known, it is possible to determine the temperature of the reduction catalytic converter on the basis of an engine characteristic map of the internal combustion engine, if appropriate while taking into consideration one or more measured temperature values. It is additionally possible, for example, for the characteristics of other components in the exhaust system to be taken into consideration, for example the heating of the exhaust gas when another catalytic converter situated upstream of the reduction catalytic converter has reached its light-off temperature. A regeneration behavior of a particle separator is to be understood, in particular, to mean the temperature of the exhaust gas reached during the regeneration, the spatial temperature distribution in the particle separator and the like. The loading is to be understood to mean the total mass of the particles which are stored and/or deposited on and/or in the particle separator. A particle separator can, for example, fundamentally be a closed particle filter, a secondary flow filter and/or an electrostatic particle separator. However, a structure of the particle separator as a closed particle filter, in particular with alternately closed channels, is fundamentally preferable.

In accordance with again a further mode of the method of the invention, a regeneration of a particle separator is carried out if the quantity of reducing agent stored in the reduction catalytic converter is less than or equal to the storage capacity at the maximum temperature, generated by the regeneration, in the reduction catalytic converter.

In accordance with again an added mode of the method of the invention, the reducing agent is provided in at least one of the following ways:

adding and at least partially converting a reducing agent precursor to form reducing agent;
adding the reducing agent;
generating and at least partially converting a reducing agent precursor to form reducing agent; and
generating the reducing agent.

A reducing agent precursor is to be understood to mean a substance which can be converted into or can release the reducing agent. For example, urea is a precursor for the reducing agent ammonia, which precursor can be hydrolyzed to form ammonia. The hydrolysis can, for example, take place in and/or on a correspondingly coated hydrolysis catalytic converter which is disposed upstream of the reduction catalytic converter. Urea can be added, for example, in the form of an aqueous solution and/or as a solid. Further reducing agent precursors for the reducing agent urea are, for example, isocyanic acid, cyanuric acid and ammonium carbamate. A generation of a reducing agent and/or of a reducing agent precursor is to be understood, in particular, to mean a reaction in which a reducing agent and/or a reducing agent precursor is generated solely from substances contained in the exhaust gas, without the addition of further substances. For example, ammonia can be generated through the use of the generation of nitrogen monoxide, in particular through the use of a plasma generator, and subsequent reduction of the nitrogen monoxide through the use of a hydrogen-containing gas.

With the objects of the invention in view, there is also provided a device for reducing the nitrogen oxide proportion in the exhaust gas of an internal combustion engine. The device comprises a reduction catalytic converter, and a control device configured to carry out the method according to the invention.

In accordance with a concomitant feature of the device of the invention, there is also provided a particle separator. The construction of the particle separator as a closed filter which, for example, has alternately closed channels, is particularly preferable in this case. The control device is preferably constructed in such a way that the quantity of reducing agent to be provided is reduced before a regeneration of the particle separator is carried out, in order to firstly release the quantity of reducing agent stored in the reduction catalytic converter, in order to thus prevent a discharge of reducing agent during the abrupt increase in the temperature of the reduction catalytic converter due to the regeneration of the particle separator.

Other features which are considered as characteristic for the invention are set forth in the appended claims, noting that the details and advantages disclosed for the method according to the invention can be transferred and applied to the device according to the invention and vice versa.

Although the invention is illustrated and described herein as embodied in a method and a device for reducing the nitrogen oxide proportion in the exhaust gas of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
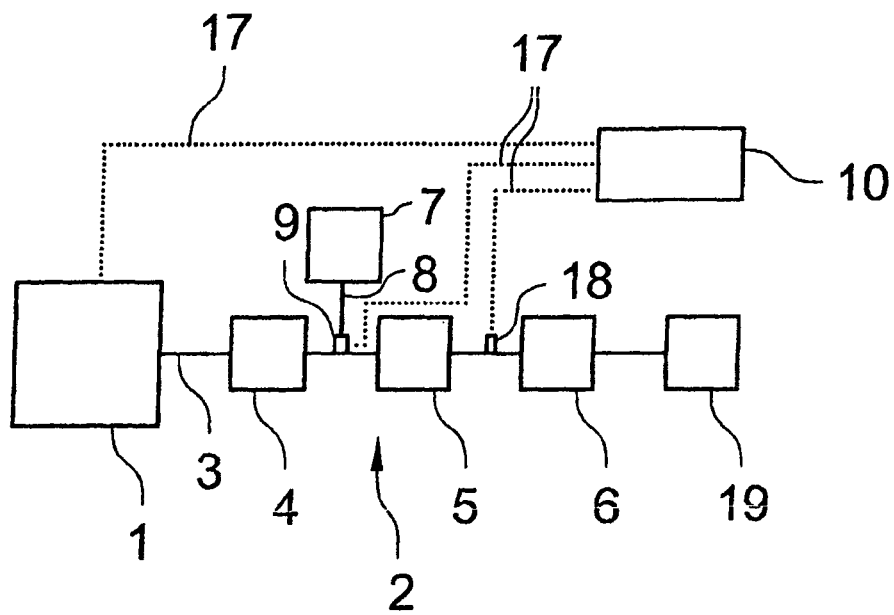
FIG. 1 is a block diagram of an exemplary embodiment of a device according to the invention.

Referring now to the figures of the drawings in detail and first, particularly, to FIG. 1 thereof, there is seen an exemplary embodiment of a device according to the invention, on the basis of which the method according to the invention is to be explained. An internal combustion engine 1 is connected to an exhaust system 2 into which the exhaust gases of the internal combustion engine 1 are conducted. The exhaust system 2 includes, in the present exemplary embodiment, exhaust lines 3, a closed particle filter 4, a hydrolysis catalytic converter 5 and a reduction catalytic converter 6. The closed particle filter 4 is, for example, composed of a honeycomb body with alternately closed channels, so that the exhaust gas must flow through porous walls situated between the channels. In order to maintain the efficiency of the particle filter 4, a regeneration of the particle filter 4 takes place at regular intervals. For this purpose, for example, the soot particles stored on and/or in the particle filter 4 are oxidized. This can be accomplished by an increase in the exhaust gas temperature through the use of a non-illustrated oxidation catalytic converter situated upstream of the particle filter 4, by virtue of the internal combustion engine 1 being operated with an excess of fuel, so that hydrocarbons pass through the internal combustion engine 1 and are converted at the oxidation catalytic converter, so that a corresponding increase in the temperature of the exhaust gas occurs. If the temperature is increased above the start temperature of the oxidation of the carbon, which is catalyzed on the particle filter 4, the carbon is oxidized exothermically, so that the temperature of the exhaust gas is further increased.

The reduction catalytic converter 5 has catalytically active substances which catalyze the selective catalytic reduction of nitrogen oxides ($NO_x$) to form nitrogen ($N_2$). In the exemplary embodiment, ammonia is used as a reducing agent and urea as a reducing agent precursor. Urea (($NH_2)_2CO$) is stored, for example as an aqueous solution and/or as a solid, in a urea tank 7 and is transported through an inlet line 8 to an apparatus 9 for adding urea. The apparatus 9 for adding urea is embodied, in the case of an aqueous urea solution, for example, as a nozzle. Through the use of the apparatus 9 for adding urea, the urea is introduced into the exhaust line 3 upstream of the hydrolysis catalytic converter 5. The hydrolysis catalytic converter 5 includes a structure which is provided with a corresponding catalytically active coating. Thermolysis and/or hydrolysis of the urea to form ammonia and carbon dioxide takes place on and/or at the hydrolysis catalytic converter 5. The ammonia which is generated in this way is transported with the exhaust gas to the reduction catalytic converter 6 and reacts there with the nitrogen oxides contained in the exhaust gas.

A control device 10 is also provided. The control device 10 determines the quantity of reducing agent to be provided and correspondingly activates the apparatus 9 for adding urea. The reduction catalytic converter 6 includes a honeycomb body which is constructed from metallic layers and which forms cavities that can be traversed by exhaust gas and are formed by the layers. The honeycomb body is provided with a ceramic coating, a washcoat, which has corresponding catalytically active substances that are present in a finely distributed manner in the washcoat. Ammonia molecules can be physisorbed and/or chemisorbed in the washcoat, so that the reduction catalytic converter 6 has a storage capacity for ammonia, at a defined temperature.

Figure 2:
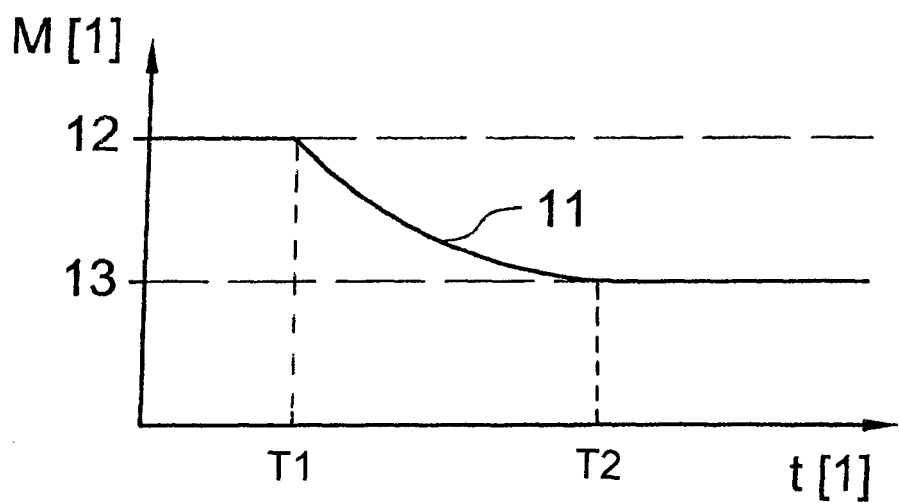
FIG. 2 is a diagram showing a time profile of a quantity of reducing agent stored in a reduction catalytic converter.

FIG. 2 shows a time profile 11 of a mass M of the ammonia stored in the reduction catalytic converter 6. Both a time t as well as the mass M are given in arbitrary units. The reduction catalytic converter 6 has a first storage capacity 12 at a first temperature T1, and a second storage capacity 13, which is lower than the first storage capacity 12, at a second, higher temperature T2. If the temperature of the reduction catalytic converter 6 increases from the first temperature T1 to the second temperature T2, then a desorption of the stored ammonia takes place, which is discharged to the atmosphere without being consumed. According to the invention, this is counteracted in that a controlled desorption of the ammonia from the reduction catalytic converter 6 is brought about before the temperature T2 is reached, as shown by the time profile 11 in FIG. 2. This is achieved according to the invention in that, instead of adding the quantity of ammonia required for a stoichiometric conversion of the nitrogen oxides without taking into consideration the storage capacity, a smaller quantity of ammonia is added. This leads to the desorption of a part of the ammonia stored in the reduction catalytic converter 6, so that despite a reduced provided quantity of ammonia, the nitrogen oxides are substantially completely converted, but at the same time, the quantity of ammonia stored in the reduction catalytic converter 6 is reduced. If the temperature is then increased to the temperature T2, then the stored quantity of ammonia is less than or equal to the second storage capacity 13, so that no uncontrolled discharge of ammonia to the atmosphere takes place.

Figure 3:
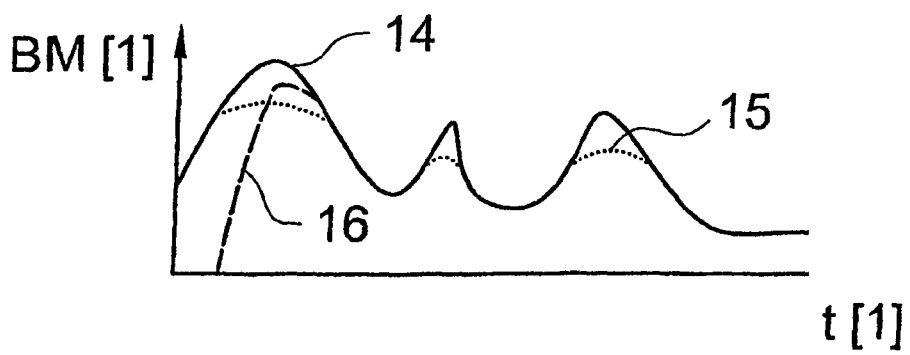
FIG. 3 is a diagram showing a plurality of time profiles of the quantity of reducing agent to be provided.

FIG. 3 illustrates this process by diagrammatically showing time profiles of a quantity BM of ammonia to be provided. Both the quantity BM to be provided as well as the time t are given in arbitrary units. It is necessary to add a first quantity 14 of ammonia over the time t for the stoichiometric conversion of the nitrogen oxides in the exhaust gas, without taking into consideration the storage capacity of the reduction catalytic converter 6. The time profile of the first quantity 14 is shown by a solid line. Instead of the first quantity 14, however, a second quantity 15 (shown by a dotted line) or a third quantity 16 (shown by a dashed line) of ammonia is added. The time profiles of the second quantity 15 and the third quantity 16 of ammonia lie below the profile of the first quantity 14 in partial regions. The quantity of ammonia which is missing in this case is replenished by ammonia desorbed from the reduction catalytic converter 6.

The quantity of ammonia to be provided and its time profile is determined in the control device 10. The control device 10 is connected through data lines 17 to the apparatus 9 for adding urea and, in the exemplary embodiment, to the internal combustion engine 1 and to a temperature sensor 18 which is provided upstream of the reduction catalytic converter 6 in contact with the exhaust line 3. The control device 10 can calculate the present temperature of the reduction catalytic converter 6 on the basis of data of an engine controller, which can likewise be integrated in the control device 10, and on the basis of the data of the temperature sensor 18. It is also possible for the future profile of the temperature of the reduction catalytic converter 6 to be calculated, for example also taking into consideration a regeneration of the particle filter 4 which is to be carried out in the future. It is thus, for example, possible for the first temperature T1 in the above-specified example to represent the present temperature of the reduction catalytic converter 6 and the second temperature T2 to represent the highest temperature of the reduction catalytic converter 6 to be expected during and/or after a regeneration of the particle filter 4. In this case, it can be effectively prevented that non-converted ammonia is discharged to the atmosphere due to the temperature increased by the regeneration of the particle filter 6. This advantageously reduces the ammonia consumption.

An oxidation catalytic converter 19 is provided downstream of the reduction catalytic converter 6. If reducing agent should nevertheless pass through the reduction catalytic converter 6, the reducing agent is oxidized on the oxidation catalytic converter 19 and therefore does not pass into the atmosphere. The capacity of the oxidation catalytic converter 19 for converting reducing agent can advantageously alternatively or additionally be adapted to the difference in the storage capacities at normal operating temperature and at the highest temperature which is to be expected, for example within the context of a regeneration of the particle filter 4, so that it is ensured that a breakthrough of ammonia to the atmosphere is prevented even without the preceding reduction, according to the invention, of the quantity of ammonia to be provided.

The method according to the invention permits the adaptation of the quantity of reducing agent to be provided to the future temperature of the reduction catalytic converter 6 and to the storage capacity 12, 13 at that temperature. In this way, it can, for example, be prevented that reducing agent is desorbed out of the reduction catalytic converter 6 if the temperature of the reduction catalytic converter 6 is increased, for example as a result of a regeneration of the particle filter 4. For this purpose, in the run-up to the regeneration of the particle filter 4, instead of a first quantity 14 of reducing agent required for the stoichiometric conversion of the nitrogen oxides in the exhaust gas without taking into consideration the storage capacity 12, 13, a reduced quantity 15, 16 of reducing agent is provided.

The invention claimed is:

1. A method for reducing the nitrogen oxide proportion in the exhaust gas of an internal combustion engine, the method comprising the following steps:
   carrying out a selective catalytic reduction at a reduction catalytic converter by providing a reducing agent at least in a discontinuous manner;
   determining a quantity of the reducing agent to be provided by taking into consideration a storage capacity of the reduction catalytic converter for the reducing agent and a dependency of the storage capacity on a temperature of the reduction catalytic converter;
   determining the temperature of the reduction catalytic converter in at least one of the following ways:
      measuring the temperature of the reduction catalytic converter; or
      calculating the temperature of the reduction catalytic converter;
   taking at least one of the following items of information into consideration in the calculation of the temperature of the reduction catalytic converter:
      a measured temperature upstream of the reduction catalytic converter;
      a measured temperature downstream of the reduction catalytic converter;
      present operating data of the internal combustion engine;
      operating data of the internal combustion engine from the past;
      a regeneration behavior of a particle separator; or
      a loading of a particle separator; and
   carrying out a regeneration of the particle separator if the quantity of the reducing agent stored in the reduction catalytic converter is less than or equal to a storage capacity at a maximum temperature, generated by the regeneration, in the reduction catalytic converter.

2. The method according to claim 1, which further comprises providing the reducing agent in at least one of the following ways:
   adding and at least partially converting a reducing agent precursor to form the reducing agent;
   adding the reducing agent;
   generating and at least partially converting a reducing agent precursor to form the reducing agent; or
   generating the reducing agent.

3. The method according to claim 1, which further comprises calculating a future profile of the temperature of the reduction catalytic converter.

4. The method according to claim 3, which further comprises, in the event of an expected increase in the temperature of the reduction catalytic converter, calculating a resulting quantity of reducing agent released from the reduction catalytic converter, and taking the resulting quantity into consideration in the provision of the reducing agent.

5. The method according to claim 4, which further comprises calculating a time profile of the release of the reducing agent.

6. The method according to claim 5, which further comprises taking the time profile of the release into consideration in the determination of the quantity of reducing agent to be provided.

7. The method according to claim 3, which further comprises, in the event of an expected decrease in the temperature of the reduction catalytic converter, calculating a quantity of reducing agent to be stored in the reduction catalytic converter and taking the calculated quantity into consideration in the provision of the reducing agent.

8. The method according to claim 7, which further comprises calculating a time profile of the storage of the reducing agent.

9. The method according to claim 8, which further comprises taking the time profile of the storage into consideration in the determination of the quantity of the reducing agent to be provided.

10. A device for reducing the nitrogen oxide proportion in the exhaust gas of an internal combustion engine, the device comprising:
    a reduction catalytic converter; and
    a control device configured to carry out the method according to claim 1.

11. . The device according to claim 10, which further comprises a particle separator.

* * * * *